United States Patent [19]

Yogo et al.

[11] Patent Number: 4,714,864
[45] Date of Patent: Dec. 22, 1987

[54] THROTTLE CONTROL DEVICE FOR VEHICLES

[75] Inventors: Kazutoshi Yogo; Hideo Wakata, both of Nagoya, Japan

[73] Assignee: Nippondenso Co., Ltd., Kariya, Japan

[21] Appl. No.: 866,348

[22] Filed: May 23, 1986

[30] Foreign Application Priority Data

May 27, 1985 [JP] Japan .................. 60-113932
Feb. 11, 1986 [JP] Japan .................. 61-28324

[51] Int. Cl.$^4$ .................. B60K 31/00; F02D 29/00
[52] U.S. Cl. .................. 318/52; 364/426; 180/197; 123/349; 123/361
[58] Field of Search .................. 318/52; 364/426; 303/20, 95; 180/197; 340/52 R; 74/854, 855, 856, 857, 865, 866, 870, 871; 123/319, 322, 349, 350, 360, 361, 376

[56] References Cited

U.S. PATENT DOCUMENTS

| | | | |
|---|---|---|---|
| 3,937,106 | 2/1976 | Smith | 74/857 |
| 4,304,202 | 12/1981 | Schofield | 180/171 X |
| 4,391,246 | 7/1983 | Kawabata et al. | 74/866 X |
| 4,475,503 | 10/1984 | Nakamura et al. | 123/361 X |
| 4,526,060 | 7/1985 | Watanabe | 123/376 X |

FOREIGN PATENT DOCUMENTS 51-31915 9/1976 Japan.
58-143142 8/1983 Japan.

*Primary Examiner*—Bentsu Ro
*Attorney, Agent, or Firm*—Cushman, Darby & Cushman

[57] ABSTRACT

An automotive engine throttle control device has a function for effecting traction control for reducing the engine throttle opening upon detection of any slip of driving wheels and a function for effecting an automatic drive control for controlling the vehicle cruising speed in conformity with a command speed. The device has a first lever operatively connected to an accelerator and a second lever operatively connected to the throttle valve. A spring is disposed to resiliently act between the first and second levers. The second lever is actuated by an actuator which operates in response to throttle opening control instructions.

17 Claims, 14 Drawing Figures

THROTTLE CONTROL DEVICE FOR VEHICLES

FIELD OF THE INVENTION

The present invention relates to a throttle control device for controlling the throttle opening of an automotive engine, used for the purpose of, for example, controlling the traction so as to avoid any slip of driving wheels of a vehicle during starting and acceleration of the vehicle as well as controlling the running speed of the vehicle.

DESCRIPTION OF THE PRIOR ART

Japanese Examined Patent Publication No. 31915/1976 discloses a "device for preventing slip of wheels" which, in the event of slip of driving wheels of a vehicle when the vehicle is being started or accelerated, is operative to decrease the opening of the throttle valve in the carburetor of the engine so as to reduce the engine output torque, thereby preventing slip of the driving wheels.

This known device has an actuator designed to operate exclusively for the purpose of prevention of slip. When the actuator operates to reduce the throttle opening, the force of the actuator is transmitted from the throttle shaft to the accelerator pedal through an accelerator cable to impart a shock to the driver's foot on the accelerator pedal.

SUMMARY OF THE INVENTION

It is an object of the present invention to provide a vehicle engine throttle control device which is free from the disadvantage pointed out above.

The vehicle engine throttle control device according to the present invention includes control means having at least one of a function to effect traction control for reducing the opening of a throttle valve of the engine upon detection of any slip of driving wheels of the vehicle, and a function to effect automatic control for controlling the vehicle cruising speed in conformity with a command speed. The control means include an actuator for producing an actuating power in accordance with throttle opening control instructions. A lever is operatively connected to an engine accelerator. Another lever is operatively connected to the actuator so as to be actuated thereby. The other lever is also operatively connected to the throttle valve so as to be able to vary the opening thereof. Spring means is arranged to resiliently act between the levers such that, when the first-said lever is moved in a direction to open the throttle valve, the other lever is also moved in the same direction and such that, when the other lever is moved independently of the first-said lever in a direction to close the throttle valve, the spring means takes up at least a part of the independent movement of the other lever to prevent the first-said lever from being moved by the other lever.

DESCRIPTION OF THE PREFERRED EMBODIMENTS

Figure 1:
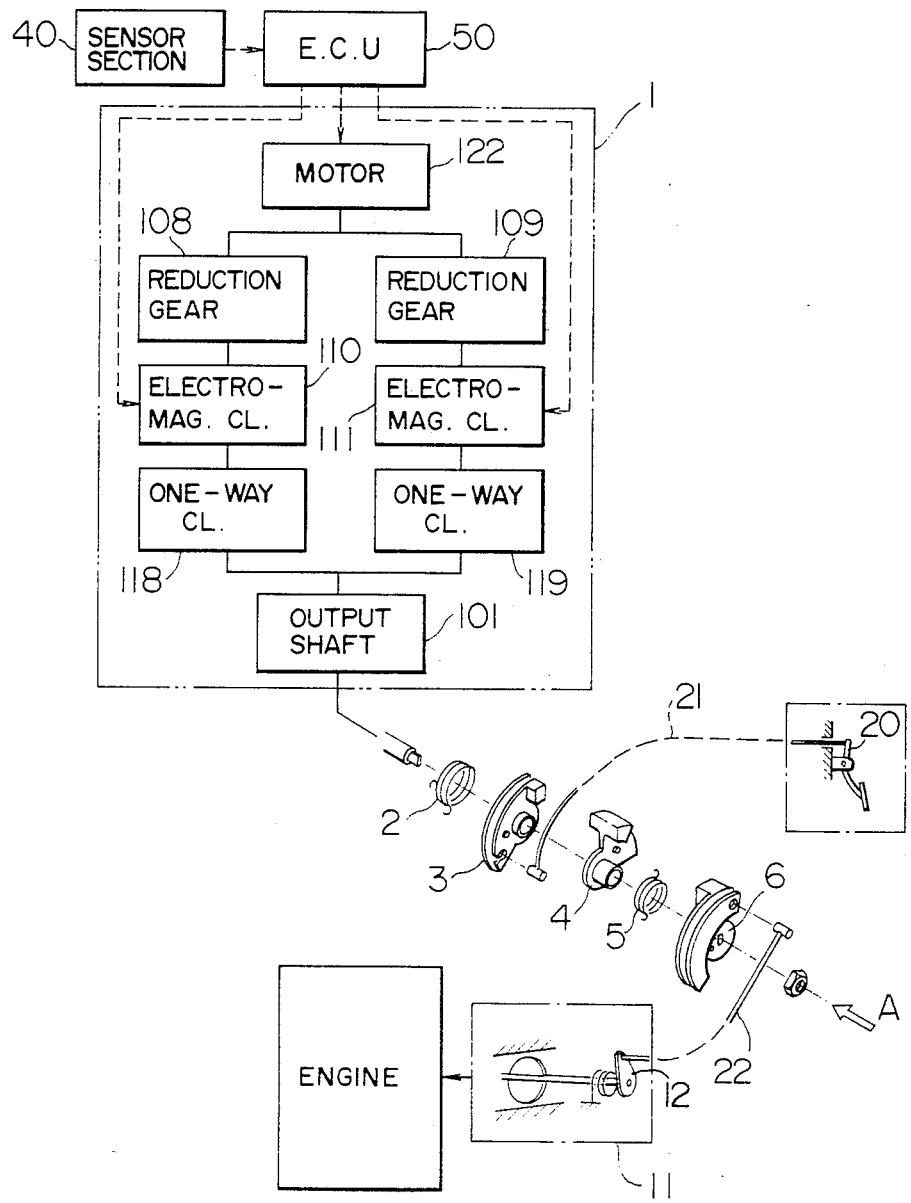
FIG. 1 is a diagrammatic illustration of the whole of a first embodiment of the invention.

Referring first to FIG. 1, an accelerator pedal 20 constituting a throttle operating section of an automative engine is connected through a control cable 21 to a lever section which in turn is connected to a throttle valve section 11 of the engine through another control cable 22. The lever section is disposed between the control cables 21 and 22 and adapted to be actuated by an actuator which is generally designated by numeral 1. The actuator 1 is adapted to be controlled by an electronic control unit 50 (referred to as "E.C.U." hereinunder) which in turn operates in response to signals from a sensor section 40 including a plurality of sensors such as those for sensing the speed of a driving wheel, speed of a non-powered wheel and so forth.

The actuator 1 has a pair of power trains disposed in parallel with each other so as to transmit the power of an actuator motor 122 to an output shaft 101 at different speed reduction ratios. More specifically, a first power train is constituted by a reduction gear 108, an electromagnetic clutch 110 and a one-way clutch 118, while a second power train includes a speed reduction gear 109, an electromagnetic clutch 111 and a one-way clutch 119. The output shaft 101 actuates the lever section mentioned before. Thus, the torque of the actuator motor 122 is transmitted to the output shaft 101 and, hence, to the lever section through either the first or the second power train. The first power train is intended for an automatic driving control, whereas the second power train is intended for the traction control for the purpose of preventing the slip of the driving wheels.

Figure 2:
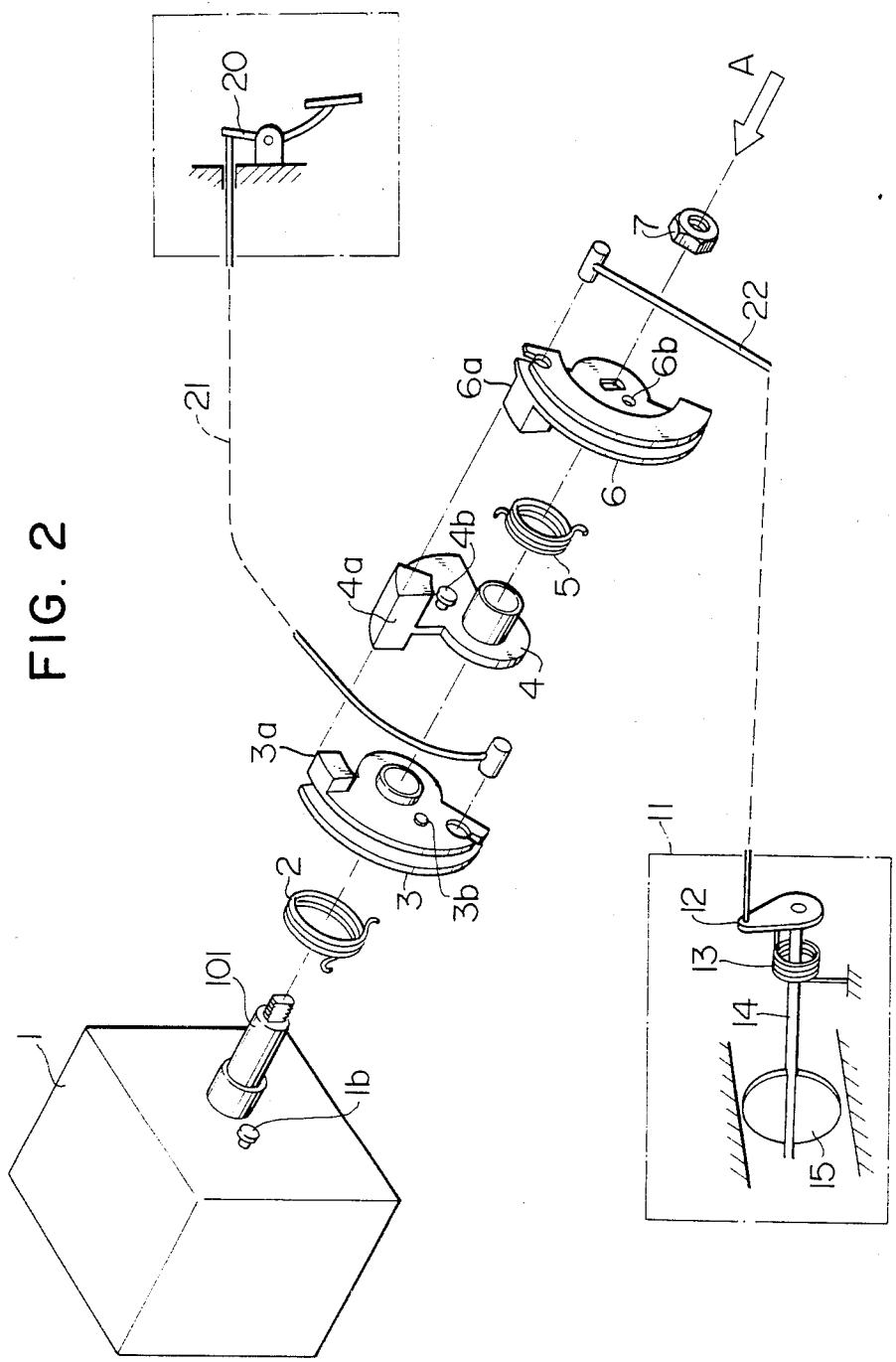
FIG. 2 illustrates, in exploded perspective view, the arrangement of various levers incorporated in the embodiment.

The details of construction of the lever section will be explained hereinunder with specific reference to FIG. 2. As explained before, the control cable 21 leading from the accelerator pedal 20 is connected to the lever section which in turn is connected to a throttle lever 12 through the control cable 22. The lever section is operatively connected to the actuator 1. More specifically, the lever section includes first and third levers 3 and 4 which are mounted rotatably on the output shaft 101 of the actuator 1. On the other hand, a second lever 6 is fixed to the output shaft 101 by maens of a nut 7. The first lever 3 is connected to the accelerator pedal 20 through the cable 21 and is biased by a spring 2 counterclockwise as viewed in the direction of an arrow A. The third lever 4 and the second lever 6 are urged by a spring 5 such that their surfaces 4a and 6a contact each other. The urging force exerted by the spring 5 is greater than the force of a spring 13 which acts to pull the second lever 6.

The second lever 6 is connected through the cable 22 to the throttle lever 12 of the throttle valve section 11 as explained before. The throttle lever 12 is biased by the spring 13 in a direction to close a throttle valve 15 so that the second lever 6 and, hence, the third lever 4 are biased counterclockwise, whereby the surfaces 4a and 3a are held in contact with each other.

Reference numerals 1b and 3b denote pins which retain both ends of the spring 2 on the actuator 1 and on the first lever 3, respectively, while numerals 4b and 6b denote retainers which retain both ends of the spring 5 on the third lever 4 and on the second lever 6, respectively.

Figure 3:
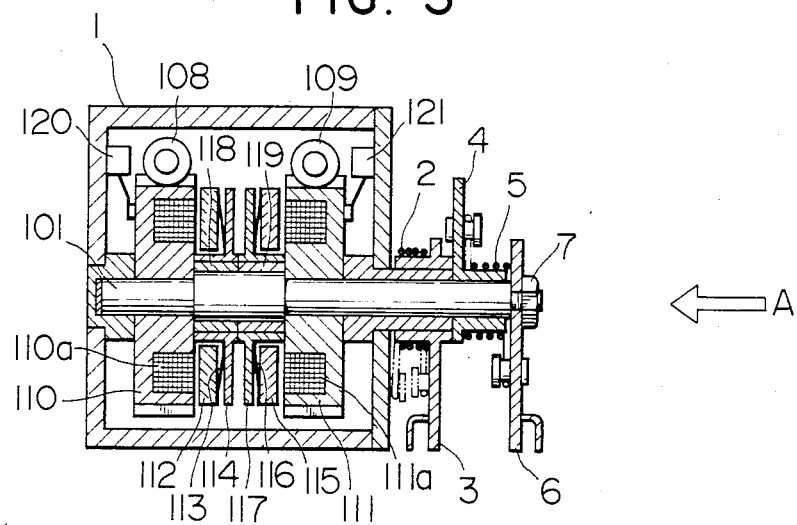
FIG. 3 is a sectional view of an actuator incorporated in the embodiment shown in FIG. 1.

The internal structure of the actuator 1 will be explained with reference to FIGS. 1 and 3. As will be seen in FIG. 1, the actuator incorporates two power trains; namely, the first power train constituted by the speed reduction gear 108, electromagnetic clutch 110 and the one-way clutch 118 and the second power train constituted by the speed reduction gear 109, electromagnetic clutch 111 and the one-way clutch 119. The mechanical construction of the actuator is shown in FIG. 3. The electromagnet clutches 110 and 111 and the one-way clutches 118 and 119 are rotatably carried by the output shaft 101. Plates 114 and 117 are fixed to the one-way clutches 118 and 119, respectively. Clutch plates 112 and 115 are associated with the plates 114 and 117 with leaf springs 113 and 116 interposed therebetween, respectively. The electromagnetic clutches 110 and 111 have coils 110a and 111a which are adapted to be energized by electric power supplied through terminals 120 and 121, respectively. The arrangement is such that, when the coil 110a is energized, the clutch plate 112 engages with the electromagnetic clutch 110, whereas, when the coil 111a is energized, the clutch plate 115 engages with the electromagnetic clutch 111. The torque of the motor (not shown) is transmitted to the electromagnetic clutches 110 and 111 through worm gears 108 and 109. When the coil 110a or the coil 111a is energized, the torque is further transmitted to the output shaft 101 either through the first power train constituted by the clutch plate 112, the leaf spring 113, the plate 114 and the one-way clutch 118 or through the second power train constituted by the clutch plate 115, the leaf spring 116, the plate 117 and the one-way clutch 119. The one-way clutch 118 transits the torque of the plate 114 to the output shaft 101 only when the plate 114 rotates clockwise as viewed in the direction of the arrow A, while the one-way clutch 119 transmits the torque of the plate 117 to the output shaft 101 only when the plate 117 rotates counterclockwise.

The first power train constituted by the worm gear 108, the electromagnetic clutch 110, the clutch plate 112, the one-way clutch 118 and the terminal 120 is used for the automatic drive control of the vehicle, whereas the second power train constituted by the worm gear 109, the electromagnetic clutch 111, the clutch plate 115, the leaf spring 116, the plate 117, the one-way clutch 119 and the terminal 121 is used for the traction control for the purpose of preventing slip of the driving wheels of the vehicle.

The traction control for the purpose of prevention of slip of the driving wheels requires a quick response of the throttle operation, whereas the automatic drive control requires a high resolution of the throttle opening for enabling a delicate control of the throttle opening, although the requirement for high response speed is not so critical in this case. According to the invention, therefore, the worm gear 108 for the automatic drive control provides a comparatively small speed reduction ratio, while the worm gear 108 is designed to provide a large speed reduction ratio, so that optimum throttle operation speeds are obtained in both cases. The operation of this embodiment will be described hereinunder.

(i) Normal Speed Control By Accelerator

When the driver depresses the accelerator pedal 20, the first lever 3 is rotated clockwise through the control cable 21 so that the third lever 4 is also rotated in the same direction as it is pushed by the first lever 3. The electromagnetic clutches 110 and 111 in the actuator 1 are normally not energized, so that the output shaft 101 can rotate freely. In addition, since the force of the spring 5 between the levers 4 and 6 is greater than the force of the spring 13 which pulls the lever 6, the lever 6 is also rotated following the rotation of the lever 4 with the surface 6a of the lever 6 held in contact with the surface 4a of the lever 4. In consequence, the throttle lever 12 is pulled by the cable 22 to open the throttle valve 15.

When the driver reduces the amount of depression of the accelerator pedal 20, the levers 3, 4 and 6 and, hence, the throttle lever 12 are rotated counter-clockwise, so that the throttle valve 15 is closed. Thus, during the normal throttle operation, throttle valve 15 is mechanically actuated by the accelerator pedal 20 such that a constant relationship is maintained between the throttle opening and the amount of depression of the accelerator pedal.

(ii) Traction Control for Preventing Slip of Driving Wheels

Any slip of the driving wheels at the time of starting or acceleration adversely affects the running stability and impairs the acceleration of the vehicle speed. The E.C.U. 50 judges the occurrence of the slip of the driving wheels on the basis of the signals delivered from the sensor section 40. When the slip occurs, the E.C.U. 50 controls the actuator 1 so as to decrease the throttle opening to reduce the engine output torque for thereby eliminating the slip. When the slip of the driving wheels is detected by the E.C.U. 50, the coil 111a is energized so that the electromagnetic clutch 111 is brought into engagement with the clutch plate 115, thereby causing the output shaft 101 to be rotated counterclockwise by the power of the motor 122. This causes the lever 6 fixed to the output shaft 101 to rotate in the counterclockwise direction, so that the control cable 22 is slacked to allow the throttle opening to be decreased. At this time, since the accelerator pedal 20 has been decreased, the levers 3 and 4 do not rotate counterclockwise, but only the lever 6 is rotated counterclockwise to move its surface 6a away from the surface 4a of the lever 4. When the slip of the driving wheels is eliminated, the motor is rotated in the reversed direction so that electromagnetic clutch 111 is rotated clockwise. This rotation is not directly transmitted to the output shaft 101 due to the function of the one-way clutch 119, but this is followed by the rotation of the output shaft 101 caused by the spring 5 and thus by the lever 6, so that the throttle opening is increased. When the throttle valve 15 has been rotated to the position corresponding to the position of the accelerator pedal, the surface 6a of the lever 6 abuts the surface 4a of the lever 4 to prevent any further rotation of the lever 6. Due to the one-way clutch 119, the opening degree of the throttle valve 16 is not increased further even if the motor continues to operate. The motor finishes its operation after the motor has rotated the electromagnetic clutch 111 clockwise for a predetermined time period, e.g., 5 to 11 seconds. During the traction control for preventing slip of the driving wheels, therefore, the throttle opening does not increase beyond the extent corresponding to the position of the depressed throttle pedal and, even when the driver has released the accelerator pedal 20 abruptly, the throttle valve 15 is closed without delay.

(iii) Automatic Drive Control

During the automatic drive control, the coil 110a is energized to cause the electromagnetic clutch 110 to engage with the clutch plate 112 so that the output shaft 101 is rotated clockwise by the power of the motor 122. In consequence, the lever 6 is rotated in the same direction, so that the throttle lever 12 is pulled by the control cable 22 to open the throttle valve 15. In this case, although the lever 4 is forced by the lever 6 to rotate in the same direction, the lever 3 is not rotated, so that the throttle opening can be varied automatically to keep a constant vehicle speed without requiring the throttle control through the accelerator pedal. However, when the driver depresses the accelerator pedal in order to accelerate the vehicle speed, the lever 3 is rotated clockwise by the control cable 21 as in the case of the normal throttle control. The lever 3 in turn forces the lever 4 to rotate clockwise, so that the lever 6 is biased in the same direction by the spring 5. Consequently, the lever 6 is rotated clockwise, while allowing the one-way clutch 118 to idle, so that the throttle valve 15 is opened in the same manner as in the ordinary throttle control through the accelerator pedal. This accelerating operation causes the motor of the actuator 1 to be rotated in such a direction as to rotate the output shaft 101 counterclockwise. However, in this case, the rotation of the motor shaft is not transmitted to the output shaft 101 due to the function of the one-way clutch 118. Thus, the motor stops its control operation after rotating the electromagnetic clutch 110 counterclockwise for a predetermined time period, e.g., 5 to 10 seconds, and commences the control operation again when the vehicle speed is lowered below a predetermined speed.

Figure 4:
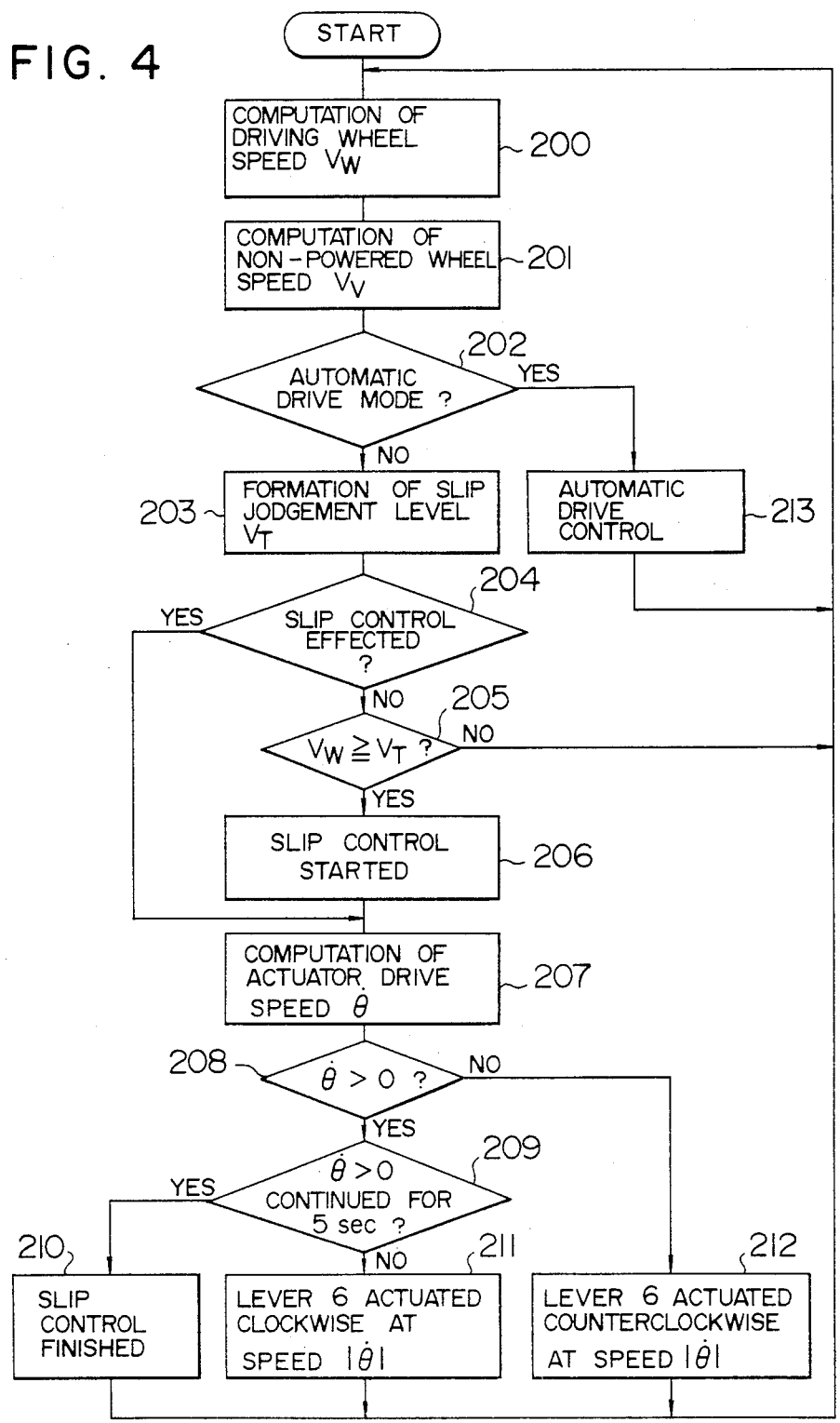
FIG. 4 is a flow chart showing the steps of arithmetic operation performed by an electronic control unit incorporated in the embodiment shown in FIG. 1.

An example of operation of the E.C.U. 50 will be explained hereinunder with specific reference to FIG. 4.

In Steps 200 and 201, the speed Vw of the driving wheels and the speed Vv of the non-powered wheels are computed on the basis of signals from sensor section 40. In Step 202, a judgement is conducted as to whether the instant operation mode is the automatic drive control mode or not. If the answer is YES, the process proceeds to Step 213 in which the control proceeds with a program for the automatic drive control mode and the process returns to Step 200. On the other hand, if the judgement in Step 202 has proved that the instant control mode is not the automatic drive control mode, the process proceeds to Step 203 in which a computation is conducted to form a slip judgement threshold level $V_T$ which is given by $V_T = K \cdot Vv + Vo$, where K represents a factor (usually, from 1.1 to 2.0) for determining the driving wheel speed corresponding to a command slip rate, while $V_O$ represents an offset speed which is usually 1 to 5 Km/sec. Then, a judgement is conducted in Step 204 as to whether the traction control for preventing slip of the driving wheels (i.e., slip control) is being effected or not. If the answer is YES, the process proceeds to Step 207. Conversely, if the judgement in Step 204 has proved that the slip control has not been commenced, the process proceeds to Step 205 in which the judgement of the state of slip is conducted. Namely, if the condition $Vw < V_T$ is met, the E.C.U. 50 judges that no slip is taking place in driving wheels and the process returns to Step 200 without effecting any slip control. However, if the condition of $Vw \geq V_T$ is met, the E.C.U. judges that slip is taking place in the driving wheels, so that the process proceeds to Step 206 so as to commence the slip control by energizing the coil 111a of the actuator 1. The process then proceeds to Step 207 in which the speed $\dot{\theta}$ at which the lever 6 of the actuator 1 is to be driven is computed by, for example, $\dot{\theta} = A(Vw - F_T)$, $(A < 0)$. Then, in Step 208, a judgement is conducted as to whether the speed $\dot{\theta}$ is positive or negative. If the condition of $\theta \leq 0$ is met, the process proceeds to Step 212 in which the E.C.U. 50 instructs the actuator 1 to actuate the lever 6 at the speed $|\dot{\theta}|$ in the counterclockwise direction, i.e., in the direction to reduce the throttle opening. The process then returns to Step 200. On the other hand, when the judgement in Step 208 has proved that the condition of $\dot{\theta} > 0$ is met, the process proceeds to Step 209 in which a judgement is conducted as to whether this condition $\dot{\theta} > 0$) has been maintained for a predetermined period, e.g., 5 seconds. If the answer is NO, the process proceeds to Step 211 in which the actuator 1 is operated to actuate the lever 6 at the speed $|\dot{\theta}|$ in the clockwise direction, i.e., in the direction for opening the throttle valve. The process then returns to Step 200. Conversely, if the judgement in Step 209 has proved that the condition of $\dot{\theta} > 0$ has been maintained for the predetermined period, the E.C.U. 50 judges that the throttle valve has been already moved to the position corresponding to the instant amount of depression of the accelerator pedal, and the process proceeds to Step 210 thereby completing the slip control, whereby the supply of the electrical power to the coil 111a of the actuator 1 is finished and the process returns to Step 200.

Figure 5:
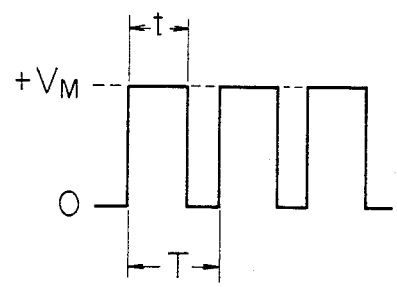
FIG. 5 is a waveform chart illustrating the duty control of a motor for an actuator incorporated in the embodiment shown in FIG. 1.

During the control of the slip, the speed $\dot{\theta}$ at which the lever 6 is to be actuated by the actuator 1 is computed in Step 207 in accordance with the difference between Vw and $V_T$, so that the throttle valve 15 is opened and closed at a speed according to the state of the slip. In order to vary the speed of operation of the actuator 1, the E.C.U. 50 effects a duty control of the voltage applied to the motor of the actuator, as shown in FIG. 5. The duty ratio is given as the ratio of the duration t of the energizing pulse current to a predetermined constant cycle T. The speed $|\dot{\theta}|$ at which the lever 6 is operated is increased as the value of the duty ratio t/T is increased.

In this embodiment, a single actuator is used both for the traction or slip control and the automatic drive control. This embodiment, therefore, is capable of performing the throttle control both in the traction control mode and the automatic drive control mode as well as in normal throttle operation mode, with a simple and less-expensive arrangement.

Figure 6:
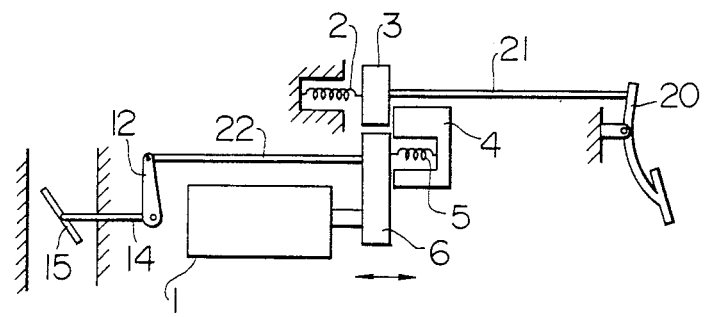
FIG. 6 is a diagrammatic illustration of the principle of operation of the embodiment shown in FIG. 1.
Figure 7:
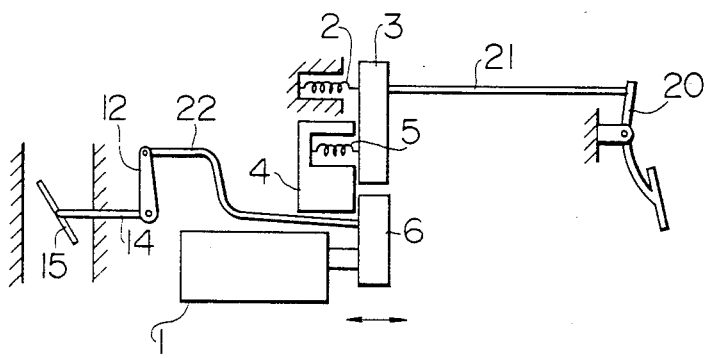
FIG. 7 is a similar illustration of the principle of operation of another embodiment of the invention.

The principle of the described embodiment is shown in FIG. 6. This, however, is not exclusive and the arrangement may be modified as shown in FIG. 7 in which the surface of the lever 4 which is to be contacted by the lever 3 is provided on the side of the lever 4 opposite to that shown in FIG. 6 and the spring 5 is disposed between the levers 3 and 4.

In the embodiment described hereinbefore, the actuator incorporates one-way clutches which control the direction of transmission of torque from the motor to the output shaft and the arrangement is such that, in slip control mode, when the motor has operated in the throttle opening direction for a predetermined time period, the E.C.U. judges that the throttle opening has been varied to the extent corresponding to the instant position of the accelerator pedal and thus, the traction control is finished. The detection of completion of the throttle control operation, however, may be done by other means such as a switch capable of detecting the contact between the surfaces 4a and 6a of the levers 4 and 6, or sensors operative to sense the throttle opening and the amount of depression of the accelerator pedal. Upon receipt of a signal from such a switch or sensors, the E.C.U. operates to finish the traction control.

Figure 8:
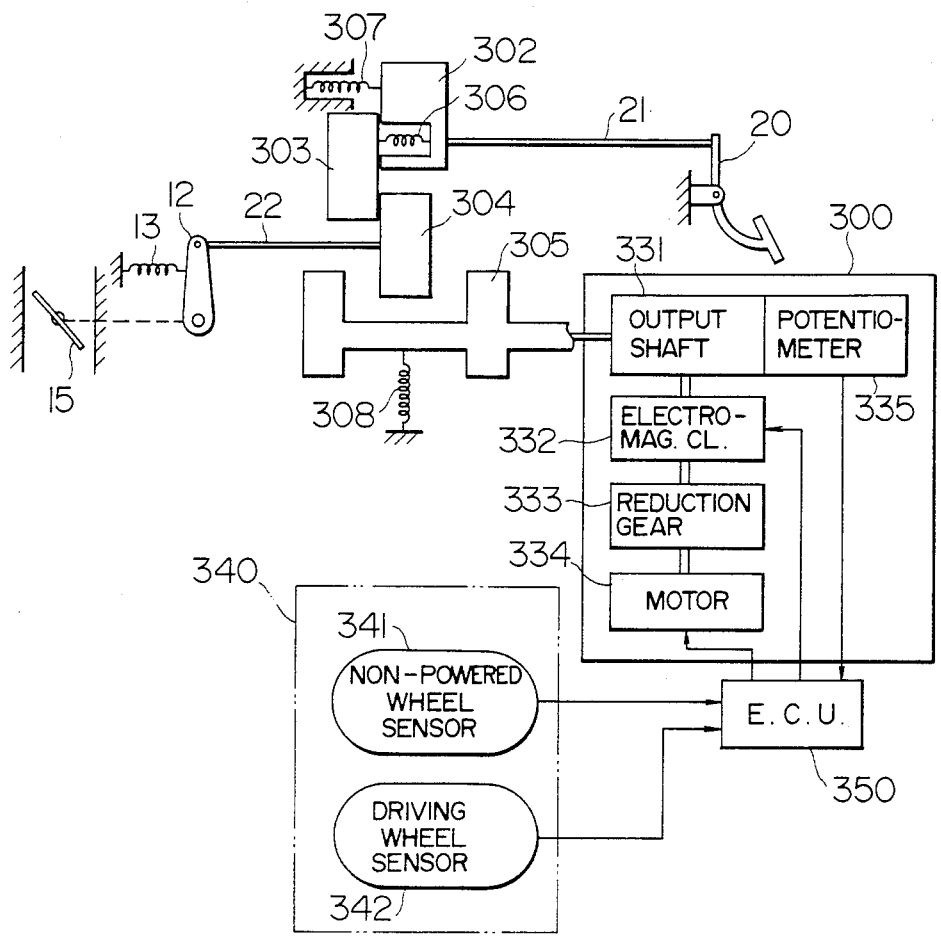
FIG. 8 is a diagrammatic illustration of the whole of still another embodiment of the invention.
Figure 9:
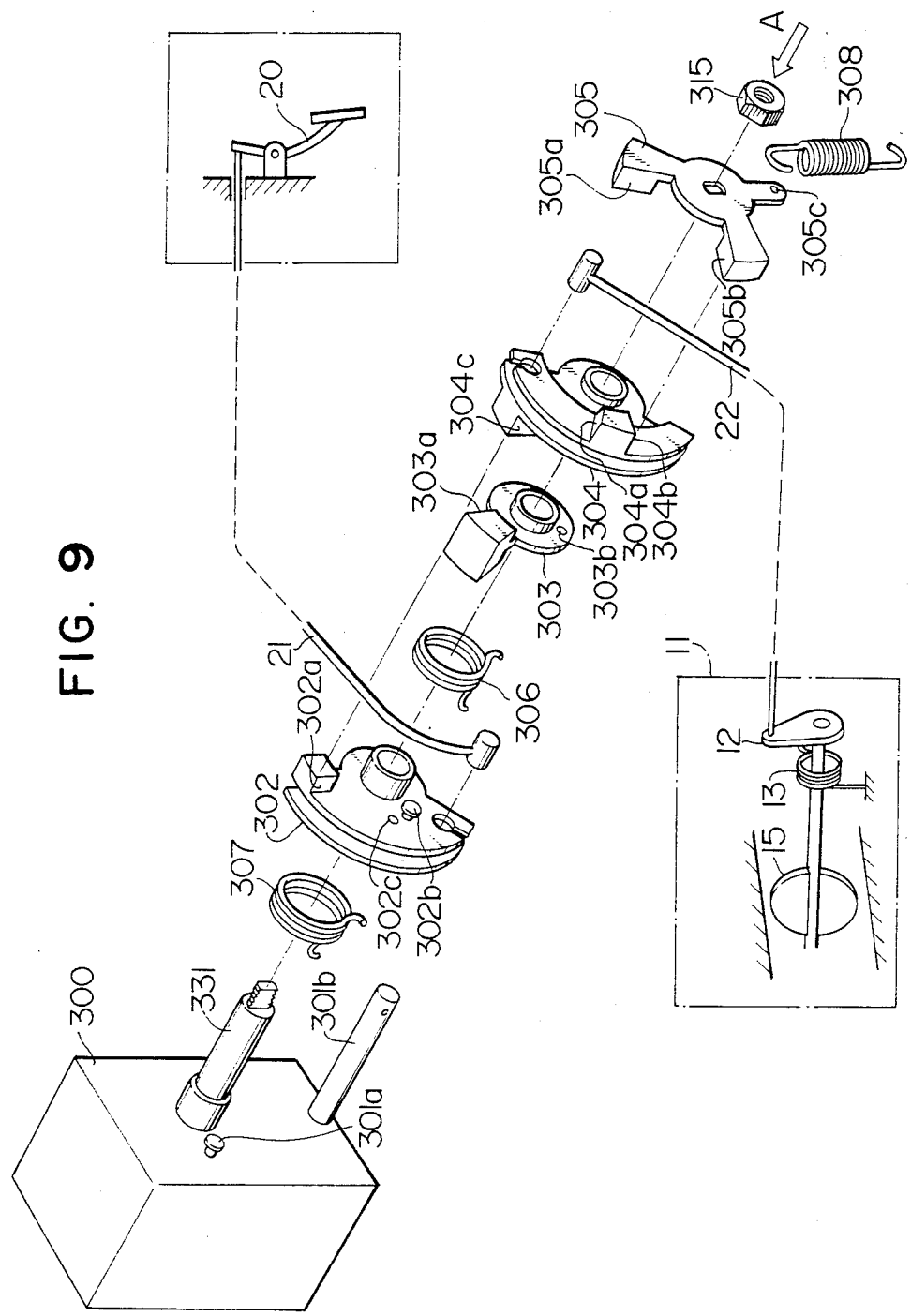
FIG. 9 illustrates, in exploded perspective view, the arrangement of various levers incorporated in the embodiment shown in FIG. 8.

FIG. 8 illustrates the principle of still another embodiment of the invention, while FIG. 9 shows the structural details of the other embodiment.

Referring to these drawings, the throttle control device has an actuator 300 which is constituted by an output shaft 331 for outputting the actuating power, an electromagnetic clutch 332, a speed reduction gear 333, an electric motor 334 as the source of the actuating power, and a potentiometer 335 for detecting the position of the output shaft. An accelerator pedal 20 constituting the accelerator operating section is connected through a control cable 21 to a lever section and a control cable 22 connected to a throttle lever 12 which is resiliently biased by the force of a spring 13 to urge a throttle valve 15 in the closing direction. More specifically, the lever section includes a first lever 302 connected to the control cable 21 leading from the accelerator pedal 20 and biased by a tension spring 307. An auxiliary lever 303 is resiliently biased into contact with the first lever 302 by the action of a spring 306. The auxiliary lever 303 in thun is contacted by a second lever 304 connected to the control cable 22. A third lever 305 is disposed so as to face the second lever 304 with a gap left therebetween. The third lever 305 is held at the initial position by the force of a spring 308 and is connected to the output shaft 331 of the actuator 300.

Reference numeral 340 designates a sensor section including sensors for sensing the speeds of different wheels of the vehicle. More specifically, this sensor section 340 includes a first speed sensor 341 for sensing the speed of non-powered wheels and a second speed sensor 342 for sensing the speed of the driving wheels. An E.C.U. 350 is operative to deliver a control signal to the actuator 300 in response to signals from the sensor section 340 as well as a signal from the potentiometer 335 which detects the rotation angle of the output shaft 331 of the actuator 300.

Referring to FIG. 9, the output shaft 331 of the actuator 300 rotatably carries the first lever 302, the second lever 304 and the auxiliary lever 303, while the third lever 305 is fixed to the output shaft 331 by means of a nut 315. As stated before, the first lever 302 is connected to the cable 21 leading from the accelerator pedal 20 and is biased in the counterclockwise direction as viewed in the direction of an arrow A by the spring 307. The first lever 302 and the auxiliary lever 303 are rotationally urged towards each other such that they contact at their surfaces 302a and 303a. The force for urging both levers 302 and 303 into mutual contact is greater than the force exerted by a spring 13 which pulls the second lever 304.

The second lever 304 is connected to the throttle lever 12 through the cable 22 as explained before. Since the throttle lever 12 is urged in the throttle-closing direction by the spring 13, the second lever 304 is rotationally urged in the counterclockwise direction to keep its surface 304c in contact with the surface 303a of the lever 303.

The third lever 305 is mounted on the output shaft 331 such that its surfaces 305a and 305b are positioned on the opposite sides of the second lever 304. The spring 308 serves to hold the third lever 305 such that the surfaces 305a and 305b of the third lever 305 are kept out of contact with surfaces 304a and 304b of the second lever 304.

Numerals 301a and 302c denote, respectively, retainers for retaining respective ends of the spring 307 on the actuator 300 and the first lever 302, respectively. Similarly, numerals 302b and 303b denote retainers which retain both ends of the spring 306 on the first lever 302 and the auxiliary lever 303. The spring 308 is retained on the third lever 305 and the actuator 300 by retainers 305c and 301b.

Figure 10:
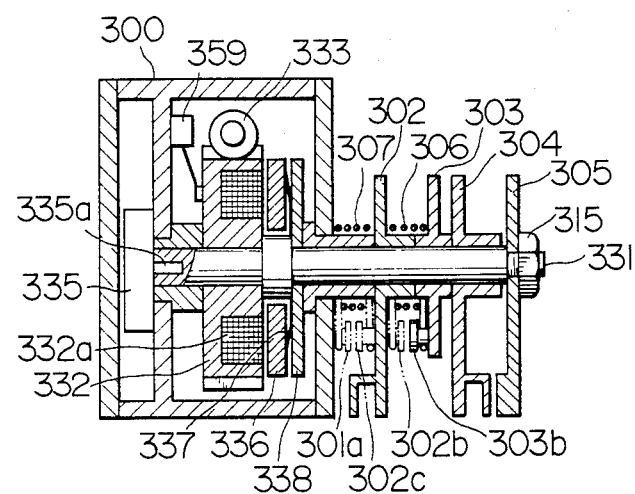
FIG. 10 is a sectional view of an actuator incorporated in the embodiment shown in FIG. 8.

The internal structure of the actuator 300 will be described in detail hereinunder with reference to FIG. 10. The electromagnetic clutch 332 is rotatably mounted on the output shaft 331. A plate 338 is fixed to the output shaft 331. A clutch plate 336 is connected to the plate 338 through a leaf spring 337. The arrangement is such that, when a coil 332a of the electromagnetic clutch 332 is energized by electric power supplied through a terminal 359, the clutch plate 336 is brought into engagement with the electromagnetic clutch 332.

The torque of the motor 334 is transmitted to the electromagnetic clutch 332 through a worm gear 333. When the coil 332a is energized, the torque is transmitted to the output shaft 331 through the clutch plate 336, the leaf spring 337 and the plate 338. The potentiometer 335 has a shaft 335a which is operatively connected to the output shaft 331 to enable the potentiometer 335 to detect the angle of rotation of the output shaft 331.

The operation of this embodiment is as follows:

(i) Normal Speed Control By Accelerator When the driver depresses the accelerator pedal 20, the first lever 302 is rotated clockwise by the control cable 21. Since the spring 306 between the levers 302 and 303 produces a force greater than the force exerted by the spring 13 which pulls the lever 304, the auxiliary lever 303 is also rotated following the rotation of the lever 302 with the surface 303a of the lever 303 kept in contact with the surface 302a of the lever 302. Furthermore, the surface 304c of the lever 304 is pushed by the surface 303a of the lever 303, so that the lever 304 is rotated in the same direction, whereby the throttle lever 12 is pulled by the cable 22 to open the throttle valve 15.

As the driver reduces the amount of depression of the accelerator pedal 20, the levers 302 and 303 and also the throttle lever 12 are rotated counterclockwise by the force of the springs 307 and 13, whereby the throttle valve 15 is closed. Thus, in the normal throttle operation for the speed control through the accelerator pedal, the throttle valve 15 is mechanically operated by the accelerator pedal 20, so that the throttle opening is always set at a level corresponding to the amount of depression of the accelerator pedal. The surface 304b of the lever 304 and the surface 305b of the lever 305 are kept away from each other even when the accelerator pedal 20 is released, i.e., even when the throttle valve 15 is in its fully closed position. In addition, the spring 308 biases the lever 305 to the position where the surface 305a of the lever 305 does not contact with the surface 304a of the lever 304 even in the throttle fully open position in which the accelerator pedal has been fully depressed. Therefore, the output shaft 331 of the actuator 300 is not operated during the normal throttle operation for the speed control through the accelerator pedal.

(ii) Traction Control for Preventing Slip of Driving Wheels

The purpose of the traction control is to avoid any loss of control of the vehicle and deterioration of the acceleration performance of the vehicle which otherwise may be caused due to slip of the driving wheels at the time of starting or acceleration. The E.C.U. 50, therefore, observes the state of occurrence of the slip on the basis of the signals delivered by the sensor portion 340 and, upon detection of any slip, delivers an instruction signal to the actuator 300 so as to reduce the engine output torque by decreasing the throttle opening, thereby eliminating the slip of the driving wheels. Namely, when the occurrence of the slip is detected, the E.C.U. 350 operates to energize the coil 332a to cause the electromagnetic clutch 332 and the clutch plate 336 to be engaged with each other so that the output shaft 331 is rotated counterclockwise by the power of the motor 334. In consequence, the lever 305 fixed to the output shaft 331 is rotated counterclockwise, so that its surface 305a is brought into contact with the surface 304a of the lever 304 to rotate the same in the counterclockwise direction, whereby the throttle valve 15 is closed by the force of the spring 13. Although the lever 303 is pressed and rotated counterclockwise by the surface 304c of the lever 304, the lever 302 is not rotated counterclockwise because the accelerator pedal has been depressed, so that the surface 303a of the lever 303 is moved away from the surface 302a of the lever 302.

When the slip is ceased, the E.C.U. 350 operates to reverse the motor 334 so that the output shaft 331 is rotated in the counterclockwise direction. In consequence, the lever 305 is rotated in the same direction and the levers 303 and 304 are also rotated in this direction with the pairs of surfaces 303a and 304c and 304a and 305a kept in contact with each other by the action of the spring 306, whereby the throttle valve 15 is opened by the pulling force of the control cable 22. When the throttle opening reaches a level corresponding to the amount of depression of the accelerator pedal, the surfaces 302a and 303a contact each other so as to prevent any further clockwise rotation of the levers 303 and 304, so that the surface 304a of the lever 304 is separated from the surface 305a of the lever 305. If the output shaft 331 is further rotated clockwise, the surface 305b would be brought into contact with the surface 304b of the lever 304 so that the lever 304 would be rotated clockwise with a result that the throttle opening would be increased beyond the amount of depression of the accelerator pedal. In order to avoid such an increase in the throttle opening, the return of the output shaft 331 to the initial position (normal position) is detected by the potentiometer 335 which in turn produces a signal for preventing any further clockwise rotation of the output shaft 331.

Upon termination of a the duration of this state for a predetermined time period, e.g., 1 to 5 seconds, the E.C.U. decides that the slip of the driving wheels has been completely eliminated and stops the motor and disengages the electromagnetic clutch to finish the traction control.

If the driver abruptly releases the accelerator pedal during the traction control, the surface 302a of the lever 302 is brought into contact with the surface 303a of the lever 303 to rotate the lever 303 counterclockwise. As a result, the lever 304 is allowed to be rotated counterclockwise by the force of the spring 13, so that the throttle valve 15 is closed. In this case, the surface 304a of the lever 304 leaves the surface 305a of the lever 305. However, the throttle valve 15 can be closed without delay because the surface 304b is not reached by the surface 305a during return movement of the lever 304 to the position corresponding to the throttle fully closed position.

(iii) Automatic Drive Control

When the automatic drive control mode is selected, the coil 332a is energized, so that the electromagnetic clutch 332 is engaged with the clutch plate 336 thereby allowing the output shaft 331 to be rotated clockwise by the power of the motor. In consequence, the surface 305b of the lever 305 fixed to the output shaft 331 is brought into contact with the surface 304b of the lever 304 and, thereafter, the lever 304 is pushed and rotated by the lever 305 clockwise to pull the throttle lever 12 through the control cable 22, thereby opening the throttle valve 15. If the accelerator pedal 20 has not been depressed, the surface 303a of the lever 303 does not contact the surface 304c of the lever 304, so that the levers 302 and 303 are not operated. It is, therefore, possible to adjust the throttle opening so as to maintain a constant vehicle speed without necessitating the control through the accelerator pedal.

When the accelerator pedal 20 is further depressed by the driver for the purpose of accelerating the vehicle during the automatic drive control, the levers 302 and 303 are rotated clockwise by the control cable 21 as in the case of the normal throttle operation. This in turn causes the lever 304 to be pressed by the lever 303 and rotated clockwise, thereby increasing the throttle opening. In this state, therefore, the surface 304b of the lever 304 is moved away from the surface 305b of the lever 305. When the set vehicle speed is exceeded as a result of this accelerating operation, the motor 334 operates to rotate the output shaft 331 counterclockwise, i.e., in the throttle closing direction. If the output shaft 331 continues to rotate counterclockwise, the surface 305a would be brought into contact with the surface 304a to cause the lever 304 to rotate counterclockwise, with a result that the throttle opening would be reduced down below the level corresponding to the amount of depression of the accelerator pedal. In order to avoid this problem, the return of the output shaft 331 to the initial position (normal position) is detected by the potentiometer 335 which in turn delivers a signal to the E.C.U. 350 so as to prevent further rotation of the output shaft 331.

Figure 11:
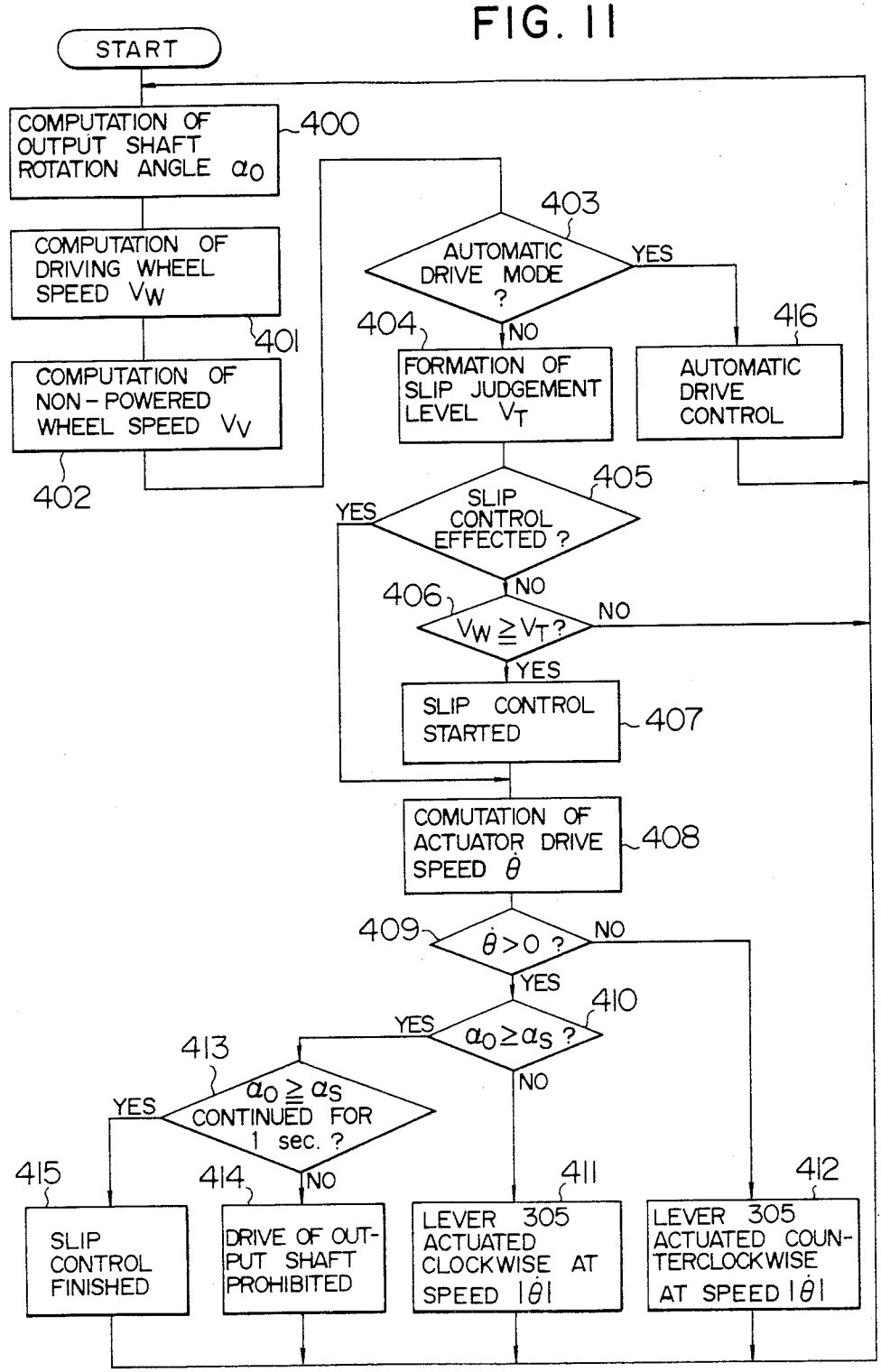
FIG. 11 is a flow chart showing the steps of arithmetic operation performed by an electronic control unit incorporated in the embodiment shown in FIG. 8.

An example of the control operation performed by the E.C.U. 350 will be explained hereinunder with reference to a flow chart shown in FIG. 11.

In Steps 400, 401 and 402, the rotation angle $\alpha_o$ of the output shaft 331, the speed Vw of the driving wheels and the speed Vv of the non-powered wheels are computed on the basis of the signals from the potentiometer 335 of the actuator 300 and wheel speed sensors 341 and 342. The rotation angle $\alpha_o$ of the output shaft 331 is so determined as to be increased and decreased, respectively, when the output shaft 331 is rotated counterclockwise (in the throttle-opening direction) and clockwise (in the throttle closing direction). When the control is not executed, the output shaft 331 is held by the spring 308 at a fixed rotational position which is expressed by $\alpha s$ in terms of the rotation angle.

In Step 403, a judgement is conducted as to whether the automatic drive control mode is effected or not. If the answer is YES, the process proceeds to Step 416 in which the program for the automatic drive control is executed, and then the process returns to Step 400. Conversely, if the judgement in Step 403 has proved that the automatic drive control mode has not been selected, the process proceeds to Step 404 in which a slip judgement threshold level $V_T$ is formed by $V_T = K \cdot Vv + V_0$, where K is a factor (generally ranging between 1.1 and 2.0) for determining the threshold slip rate, while $V_0$ represents an offset of speed which generally ranges between 1 and 5 Km/s.

Then, in a subsequent Step 405, a judgement is conducted as to whether the traction control for preventing slip of driving wheels is effected. If it is judged that the traction control has been commenced, the process proceeds to Step 408. However, if the judgement in Step 405 has proved that the traction control has not been commenced, the process proceeds to Step 406 in which a judgement is conducted as to the state of the slip. If the condition of $Vw < V_T$ is met in Step 406, the E.C.U. 350 judges that slip is not taking place, and returns the process to Step 400. On the other hand, when $Vw \geq V_T$ is met in Step 406, the E.C.U. 350 judges that slip is taking place, and proceeds the process to Step 407 to commence the slip control by energizing the coil 332a of the actuator 300. The process then proceeds to Step 408. In Step 407, the speed $\dot{\theta}$ at which the output shaft 331 of the actuator 300 is to be operated is computed by $\dot{\theta} = A(Vw - V_T)$, $(A<0)$. Then, in a subsequent Step 409, a judgement is conducted as to whether the speed $\dot{\theta}$ is plus or minus and, if the condition of $\dot{\theta} \leq 0$ is met, the process proceeds to Step 412 in which the E.C.U. 350 delivers a signal to the actuator 300 so as to drive the output shaft 331 at the speed $|\dot{\theta}|$ in the counterclockwise direction, i.e., in the throttle-closing direction. Thereafter, the process returns to Step 200.

Conversely, when the result of judgement in Step 409 has proved that the condition of $\dot{\theta} > 0$ is met, the process proceeds to Step 410 in which the rotation angle $\alpha$ is compared with the rotation angle $\alpha s$ which is taken when the control is not conducted. If the condition is $\alpha < \alpha s$, the process proceeds to Step 411 in which the E.C.U. 350 judges that the output shaft 331 has not been returned to the position to be taken before the commencement of the control, and delivers a signal to the actuator 300 so as to drive the output shaft clockwise, i.e., in the throttle-opening direction at the speed $|\dot{\theta}|$. The process then returns to Step 400.

On the other hand, when the judgement in Step 410 has proved that the condition of $\alpha \geq \alpha s$ is met, a judgement is conducted in Step 413 as to whether the condition has been maintained for a period longer than a predetermined time period, e.g., 1 to 5 seconds. If not, the process proceeds to Step 414 in which the E.C.U. 350 delivers a signal to the actuator 300 so as to prohibit the driving of the output shaft 331. Namely, when Step 410 is taken, the output shaft 331 is rotated clockwise, i.e., in the throttle opening direction, at the speed $|\dot{\theta}|$. The condition $\alpha_o \geq \alpha s$ represents that the output shaft 331 has been returned to the starting position. In Step 414, therefore, the E.C.U. issues the signal for preventing further clockwise driving of the output shaft 331.

However, when the judgement in Step 413 has proved that the condition of $\alpha \geq \alpha s$ has been maintained longer than the predetermined period, the E.C.U. 350 judges that the slip of the driving wheels has been completely eliminated so that no further traction control is necessary. The E.C.U. 350 then ceases the traction control by de-energizing the coil 332a of the actuator 300, and the process is returned to Step 400.

During the traction control for eliminating the slip of the driving wheels, the speed $\dot{\theta}$ at which the output shaft 331 of the actuator 300 is to be driven is computed in Step 408 on the basis of the difference between the wheel speeds Vw and Vv, so that the throttle valve 15 is opened and closed at a speed which corresponds to the state of the slip. To realize the speed control of the driving of the actuator 300, the E.C.U. 350 performs a duty ratio control of the voltage applied to the motor 334 of the actuator 300, as explained before in connection with FIG. 5.

In the embodiment shown in FIGS. 8 and 9, the rotation angle $\alpha$ of the output shaft 331 is controlled within the range given by $\alpha \leq s$ when the traction or slip control is being effected. Similarly, during the automatic drive control, the rotation angle $\alpha$ is controlled within the range given by $\alpha \geq \alpha s$. In this embodiment, therefore, the single actuator can be used both in the automatic drive control and the slip control. It is thus possible to attain an inexpensive throttle control without impairing both controlling functions.

In the embodiments described hereinbefore, since the actuator is disposed between the control cable leading from the accelerator pedal and the control cable which is connected to the throttle lever, it is not necessary to effect any change or modification to an existing throttle operating system except the lever portion which is connected to the actuator. The mechanical connection between the accelerator pedal 20 and the throttle lever 12 provides a higher reliability compared with the so-called linkless throttle operation system in which the throttle valve 15 is not mechanically connected to the accelerator pedal but is operated by a stepper motor in accordance with electric signals derived from sensors which sense the depression of the accelerator pedal and the throttle opening.

The embodiment shown in FIGS. 8 and 9 provides an additional advantage that, since the lever 305 fixed to the output shaft 331 is not operated by the lever 304 connected to the throttle lever 12 during the normal speed control through the accelerator pedal, the actuator does not cause any undesirable effect on the throttle operation by the accelerator pedal. For the same reason, the normal speed control through the accelerator pedal is not impaired even in the event that the output shaft 331 cannot be driven due to a trouble in the actuator 300.

Figure 12:
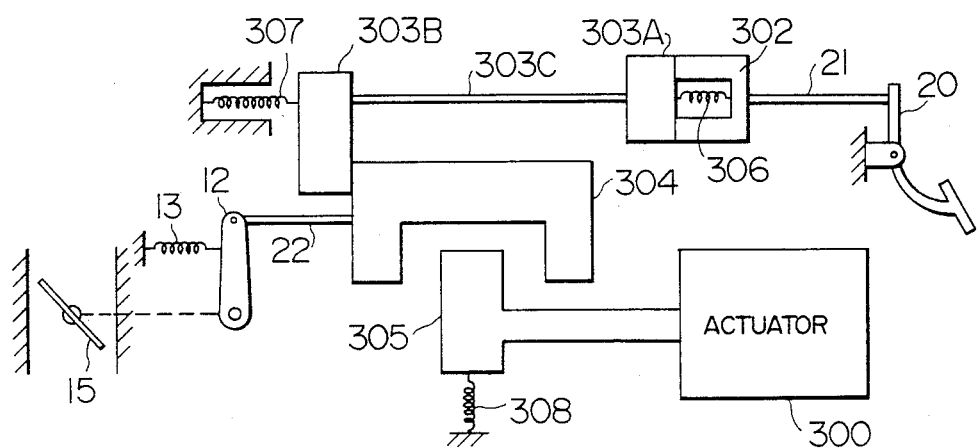
FIG. 12 is a diagrammatic illustration of the principle of operation of a further embodiment of the invention.

FIG. 12 shows a further embodiment in which the auxiliary lever 303 employed in the embodiment shown in FIG. 8 is divided into two parts 303A and 303B which are connected to each other by a control cable 303C. The lever part 303A is urged by a spring 306 into engagement with the lever 302, while the lever part 303B is mounted such that it can push the lever 304 in the throttle-opening direction.

The embodiment shown in FIG. 8 can be modified such that the spring 307 is connected to the lever 303 rather than being secured to the lever 302. In the embodiment shown in FIG. 12, the spring 307 is secured to the lever part 303B.

In the embodiment shown in FIG. 8, the lever 305 is arranged such that its surfaces 305a and 305b are positioned on both sides of a projection on the lever 304 having the contact surfaces 304a and 304b but this arrangement may be modified such that the lever 304 has surfaces which are disposed at both sides of a projection formed on the lever 305, as shown in FIG. 12. The use of the two lever parts 303A and 303B shown in FIG. 12 makes it possible to reduce the number of component parts such as levers and springs to be incorporated in the actuator 300, which in turn reduces the size of the actuator 300, thus facilitating easy mounting of the actuator on the automobile.

Figure 13:
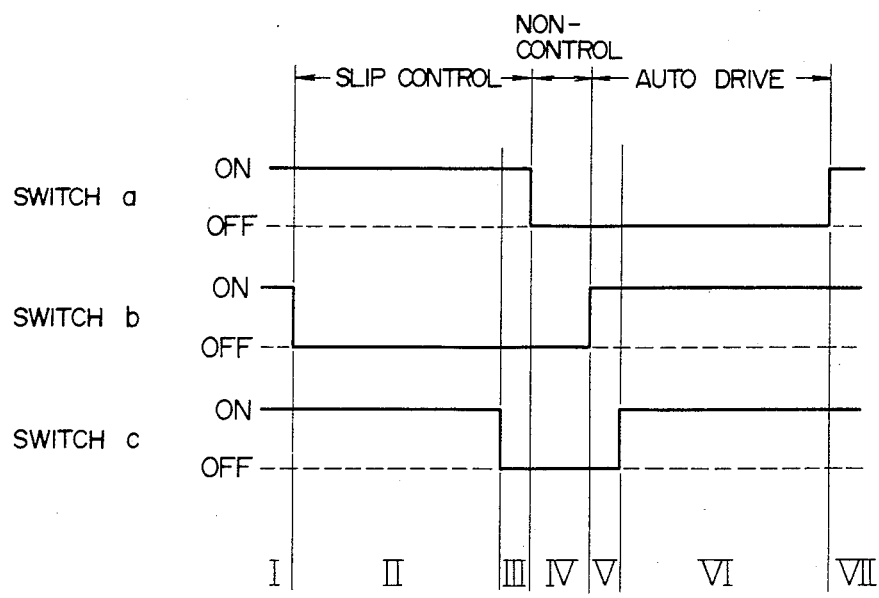
FIG. 13 is a diagrammatic illustration of controlling the rotation of an output shaft of an actuator by means of a plurality of switches.

In the embodiment shown in FIG. 8, moreover, the rotation angle αis detected by the potentiometer 335 for the purpose of preventing any excessive returning rotation of the output shaft. This arrangement, however, may be replaced by another arrangement which employs a plurality of switches in place of the potentiometer. For instance, as shown in FIG. 13, three switches a, b and c are arranged to open and close at different angular positions of the output shaft. When the control is not conducted, the switches a, b and c all produce "OFF" signals as in State IV, whereas, during the traction control, the switches produce signals in States I, II, III and IV in accordance with the counterclockwise rotation of the output shaft (leftward direction as viewed in FIG. 13), i.e., in the throttle closing direction. When the switches produce signals of State II or III, the output shaft can be rotated in either direction. In State I, the rotation of the output shaft is prevented only in the counterclockwise direction, whereas, in state IV, the rotation of the output shaft is prevented only in the clockwise direction. It will be understood that, during the slip control, it is meaningless to continue the throttle-closing operation after the throttle valve has been fully closed. Therefore, any excessive counterclockwise rotation of the output shaft is detected by the switches a, b and c which produce signals of State I which in turn operate to prevent any further counterclockwise rotation of the output shaft, thereby avoiding troubles such as lock of the motor 334 which otherwise may be caused by excessive rotation of the output shaft. On the other hand, when the output shaft has been rotated clockwise back to the starting position after the cease of the slip, signals of State IV are produced so as to prevent any further clockwise rotation of the output shaft 331 into the region in which the output shaft 331 operates during the automatic drive control.

During the slip control, the switches a, b and c produce signals of one of State I, II, III and IV without fail. If any other state signals are received by the E.C.U., it judges that there is a trouble in the switches or in the driving circuit and immediately stops the control and turns the motor and the clutch off.

On the other hand, when the automatic drive control is being executed, the signals from the switches a, b and c take one of States IV, V, VI and VII because the output shaft 331 rotates clockwise, i.e., in the throttle-opening direction. When the signals from the switches a, b and c fall in State V or VI, the output shaft 331 can be rotated in either direction. However, in State IV, the driving of the output shaft 331 is prevented only in the counterclockwise direction, whereas, in State VII, the driving of the output shaft 331 is prevented only in the clockwise direction. IN this embodiment, three switches are employed so that the above-explained operation is ensured even if one of these switches has become out of order.

The process explained hereinbefore may be conducted within a program as in the case of the embodiment shown in FIG. 8 or, alternatively, by a logic circuit constituted by IC elements or the like.

In the embodiments shown in FIGS. 1 and 8, the speed θ of driving of the output shaft is determined in accordance with the driving wheel speed Vw and the slip judgement threshold level VT. This control method, however, is only one example and the control may be conducted by other various methods. For instance, the method may be such that the E.C.U. receives an throttle opening information, then determines a variation αθ of the throttle opening required for eliminating the slip and instructs the actuator such that it changes the throttle opening by the amount corresponding to the variation Δθ.

Figure 14:
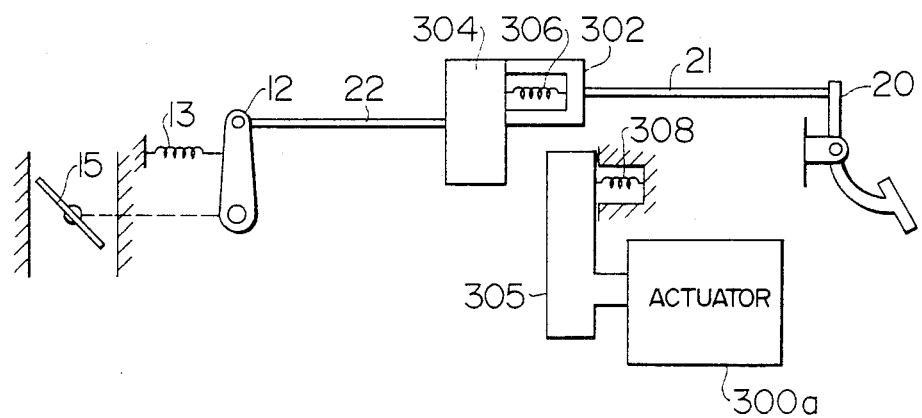
FIG. 14 is a diagrammatic illustration of the principle of operation of a still further embodiment of the invention.

The actuator of the described embodiments provides an economical advantage that it can function both for the slip control and the automatic drive control. The invention, however, does not exclude the use of an actuator which is designed to perform only the slip control as shown in FIG. 14. In this embodiment, the auxiliary lever 303 and the spring 307 of the embodiment shown in FIG. 8 are omitted and the lever 302 is connected to the lever 304 through the spring 306. The lever 305 is movable only in the direction for closing the throttle valve 15. The spring 308 holds the lever 305 at a position where the lever 305 is not contacted by the lever 304 in the normal throttle operation.

In the embodiments described hereinbefore, it is possible to provide a spring in addition to the spring 6 or 306 and dispose the two springs in parallel with each other to strengthen the mechanical connection between the accelerator pedal 20 and the throttle lever 12, so that the throttle valve 15 can surely be opened to some extent even when one of the parallel springs is broken.

What is claimed is:

1. A vehicle engine throttle control device comprising:

control means having at least one of first means to effect traction control for reducing the opening of a throttle valve of the vehicle engine upon detection of any slip of driving wheels of the vehicle, and a second means to effect an automatic drive control for controlling the vehicle cruising speed in conformity with a command speed;

a first lever operatively connected to an accelerator of the vehicle;

said control means including an actuator for producing an actuating power in accordance with throttle opening control instructions;

a second lever operatively connected to said actuator so as to be actuated by said actuating power of said actuator, said second lever being operatively connected also to an engine throttle valve so as to be able to vary the opening of said throttle valve;

a third lever adapted to be urged by said first lever and by said second only in one direction; and spring means disposed between said third lever and one of said first and second levers, said spring means being operative, when said second lever is moved with respect to said first lever in a direction to close said throttle valve, to prevent said one lever from being moved by said second lever.

2. A throttle control device according to claim 1, wherein said actuator includes an output shaft, an actuating power source common to the traction control and the automatic drive control, first and second speed reduction gears having different reduction ratios, a first one-way clutch means disposed between said first speed reduction gear and said output shaft, and a second one-way clutch means disposed between said second speed reduction gear and said output shaft, said second lever being connected to said output shaft.

3. A throttle control device according to claim 2, wherein said first one-way clutch means and said second one-way clutch means are adapted to rotatively drive said output shaft in opposite directions.

4. A throttle control device according to claim 2, wherein said first lever and said third lever are rotatably mounted on said output shaft, and further comprising a second spring means, connected to said first lever so as to resist the force exerted by said accelerator.

5. A throttle control device according to claim 1, wherein said actuator includes an actuating power source operative to drive said second lever in either direction, and means for ceasing said traction control when the throttle opening has reached a level corresponding to the amount of operation of said accelerator after the commencement of said traction control.

6. A throttle control device according to claim 1, wherein said spring means comprise a pair of springs arranged in parallel to each other.

7. A throttle control device according to claim 1, wherein said control means further includes means for producing a throttle opening control instruction signal to be coupled to said actuator and wherein said producing means is operative to cause, when said traction control function is executed, said actuator to drive said second lever at a speed substantially proportional to the difference between the speed of the driving wheels of said vehicle and a predetermined slip judgement level.

8. A vehicle engine throttle control device comprising:

control means having at least one of a first means to effect traction control for reducing the opening of a throttle valve of the vehicle engine upon detection of any slip of driving wheels of a vehicle, and a second means to effect an automatic drive control for controlling the vehicle cruising speed in conformity with a command speed;

a first lever operatively connected to an accelerator of the vehicle;

a second lever operatively connected to said throttle valve so as to be able to vary the opening of said throttle valve;

a spring means adapted to resiliently act between said first lever and said second lever such that, when said first lever is moved in a throttle-opening direction, said second lever is also moved in the same direction following the movement of said first lever and such that, when said second lever is moved with respect to said first lever and in a throttle-closing direction, the movement of said second lever is resisted by said spring means;

said control means including an actuator for producing an actuating power in accordance with throttle opening control instructions; and a third lever drivingly connected to said actuator, said third lever being disposed such that said third lever is spaced from said second lever when said actuator is not in operation to produce the actuating power and such that, when said actuator is in operation, said third lever is brought into engagement with said second lever to cause said second lever to move.

9. A throttle control device according to claim 8, wherein said third lever is as disposed so not to interfere with said second lever during normal throttle operation through said accelerator.

10. A throttle control device according to claim 8, wherein said control means further include means for detecting the operating position of said actuator to limit the range of actuating operation of said actuator.

11. A throttle control device according to claim 8, further including an auxiliary lever means engaging with said second lever and adapted to drive said second lever in a direction to open said throttle valve, said spring means being disposed between said first lever and said auxiliary lever means.

12. A throttle control device according to claim 11, wherein said auxiliary lever means comprises two lever parts which are connected to each other through a control cable, one of said lever parts being operatively connected to said first lever through said spring means, while the other lever part is engageable with and urges said second lever to open said throttle valve.

13. A throttle control device according to claim 11, wherein said actuator further includes an output shaft and is adapted to rotated said output shaft in forward or backward directions in accordance with said throttle opening control instructions, and wherein said output shaft rotatably carries said first lever, second lever and auxiliary lever means, said third lever being fixedly connected to said output shaft for rotation therewith, said device further including a second spring means which urges said first lever in the direction opposite to the direction of operation thereof by said accelerator.

14. A throttle control device according to claim 8, wherein said control means further include means for producing a throttle opening control instruction signal to be coupled to said actuator and wherein said producing means is operative to cause, when said traction control function is executed, said actuator to drive said second lever at a speed substantially proportional to the difference between the speed of the driving wheels of said vehicle and a predetermined slip judgement level.

15. A throttle control device according to claim 8, wherein said spring means comprises a pair of springs arranged in parallel to each other.

16. A throttle control device according to claim 8, wherein said actuator is adapted to perform only the traction control function.

17. A vehicle engine throttle control device comprising:

control means having at least one of a first means to effect traction control for reducing the opening of a throttle valve of the engine upon detection of any slip of driving wheels of the vehicle, and a second means to effect automatic drive control for controlling the vehicle cruising speed in conformity with a command speed;

a lever operatively connected to an accelerator of the vehicle;

said control means including an actuator for producing an actuating power in accordance with throttle opening control instructions;

another lever operatively connected to said actuator so as to be actuated by said actuating power of said actuator, the another lever being operatively connected to said throttle valve so as to be able to vary the opening of said throttle valve; and spring means arranged to resiliently act between said levers such that, when the first-said lever is moved in a direction to open said throttle valve, the another lever is also moved in the same direction and such that, when the another lever is moved independently of the first-said lever in a direction to close said throttle valve, said spring means takes up at least a part of the movement of the another lever to present the first-said lever from being moved by the another lever.

* * * * *